(No Model.)
C. & E. H. MORGAN.
MEANS FOR SECURING COVERS ON BOXES.
No. 353,801. Patented Dec. 7, 1886.
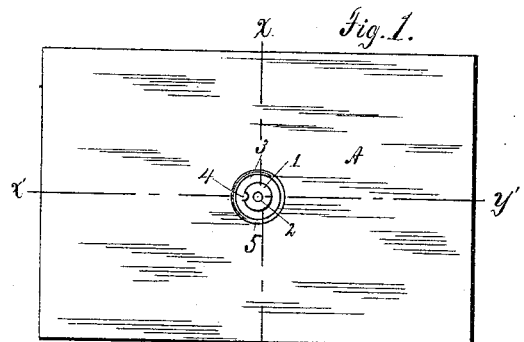
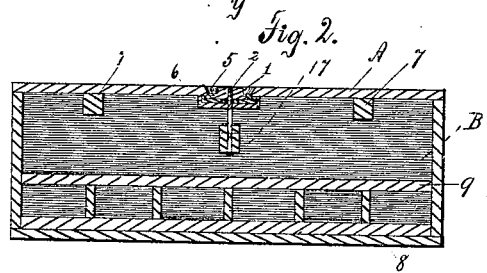
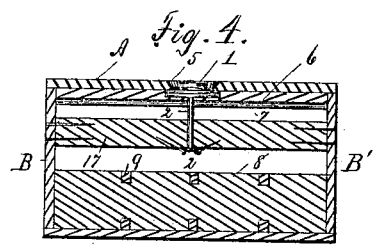
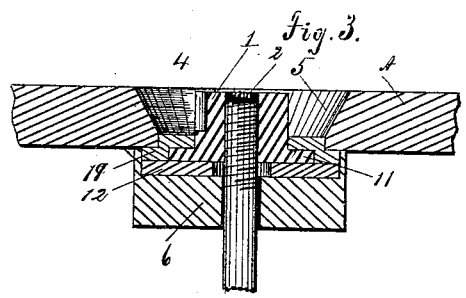
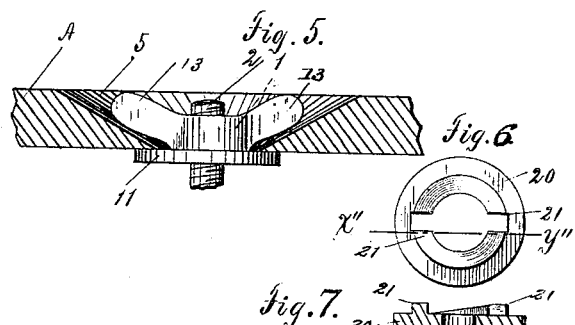
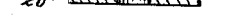
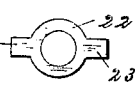
Witnesses
Albert Baumgarten
L. M. Currier
Inventors:
Charles Morgan
Edgar H. Morgan
By their Attorneys
Wiles & Greene
N. PETERS, Photo-Lithographer, Washington, D. C.

UNITED STATES PATENT OFFICE.

CHARLES MORGAN AND EDGAR H. MORGAN, OF FREEPORT, ILLINOIS, ASSIGNORS OF ONE-THIRD TO ALBERT BAUMGARTEN, OF SAME PLACE.

MEANS FOR SECURING COVERS ON BOXES.

SPECIFICATION forming part of Letters Patent No. 353,801, dated December 7, 1886.

Application filed March 26, 1886. Serial No. 196,616. (No model.)

*To all whom it may concern:*

Be it known that we, CHARLES MORGAN and EDGAR H. MORGAN, residents of Freeport, in the county of Stephenson and State of Illinois, have invented certain new and useful Improvements in Means for Securing Covers upon Boxes; and we do hereby declare the following to be a full, clear, and exact description of the invention, such as will enable others skilled in the art to which it pertains to make and use the same.

This invention has for its object the securing of covers upon boxes for eggs, bottled goods, and other merchandise, by means adapted to permit the ready and repeated removal of the cover without injury to box, cover, attachments, or contents.

It consists of a nut revolubly fixed in and below the outer surface of the cover, and a bolt passing from this nut downward and attached to a transverse bar passing through the body of the box and fixed to its opposite walls; but many of the parts involved may be varied from the forms shown and yet fully embody the more important elements believed to be new.

In the accompanying drawings, to which this specification refers, Figure 1 is a plan of the box with cover and fastening in position; Fig. 2, a section made by the plane $x'$ $y'$, Fig. 1; Fig. 3, an enlarged view of a portion of the cover and fastening, section being made on the same line as before; Fig. 4, a section made by the plane $x$ $y$, Fig. 1; and Figs. 5, 6, 7, 8 are forms adapted to replace the nut above named, in combination with the other elements of my device.

In Figs. 1, 2, 3, and 4, A is the cover, and B B' are the walls, of a box. 17 is a cross bar rigidly fixed between the sides of the box at such a point that when the box is used for bottles it may fall between the necks of two consecutive lines.

2 is a bolt passing vertically through this bar, and remaining permanently with its upper extremity slightly below the plane of the upper surface of the cover when in position. A circular nut, 1, provided with retaining-flange 11, works upon the upper part of the bolt 2. The flange lies between two circular washers, 12 19, sunk in the upper surface of a cleat, 6, upon the under surface of the cover. Over the washers is a circular opening, 5, in the cover itself, and its diameter is somewhat less than that of the washers. When the cleat 6 is rigidly secured upon the cover, both nut and washers are held in place, the nut being, however, susceptible of bodily rotation. The nut being circular in general outline, no ordinary wrench will serve to remove it, but it may be removed with a special implement adapted to engage a groove, 4, Figs. 1, and 3, in its cylindrical surface. The bar 17 has a secondary but quite important office in stiffening and strengthening the side walls of the box, which it is very desirable to make light or thin in most varieties of boxes. When such is not the case, the bolt may be attached to the bottom of the box, or to a block thereon, or to one of the partitions 8 between the lines of bottles. No portion of the fastenings projecting beyond the outer surface of the boxes, they may be piled in shipping as closely as the ordinary boxes with covers fastened by nailing.

Fig. 5 shows the nut provided with wings 13, whereby the nut may be rotated without special or separate parts. In this form, as in the circular form shown in Fig. 2, the cover is raised bodily by unscrewing the nut from the bolt.

Figs. 6 and 7 show in plan and section a different form of washer, and Fig. 8 a form of bolt-head adapted for use therewith. The bolt is not threaded, but the wings 23, passing through the slotted washer, are rotated over the inclined surfaces of lugs 21. In this form of construction the bolt itself may rotate, as it may also in the cases illustrated in Figs. 3 and 5, if the circular or the winged nut be rigidly fixed upon the bolt, which should be threaded and provided with a nut at the lower end. If forms requiring no wrench be employed, the boxes are secured against opening while in transit by pasting a seal over the aperture 5 in the body of the cover. In large or long boxes, where a single point of attachment is insufficient to retain the cover, duplicates of the device described may be employed at other points, and in any case where bottles are to be shipped extra cleats 7, also between the rows of bottle-necks, may be attached to the surface of the cover; and if it be desirable to have the inner surface of the cover plain, the cleats may be placed upon the outside, the recess 5 being then made in the cleat 6.

Having now fully shown and explained our invention, what we claim is—

1. In means for fastening covers upon boxes, a bolt rigidly fixed in the interior of the box and extending nearly through the cover when in place, combined with a nut permanently and revolubly attached to the cover and lying below the surface thereof in an external depression, said nut being adapted to engage said bolt, and thereby retain the cover upon the box.

2. In combination with the body of a box, B, the recessed or perforated cover A, cleat 6, bar 17, bolt 2, and nut 1, lying in the opening in the cover, and having a flange, 11, whereby it is secured to the cover, substantially as set forth.

3. The box B, provided with a transverse bar, 17, the cover A, provided with an aperture, 5, cleat 6, bolt 2, nut 1, with flange 11, and the washers 12 19, all combined and co-operating substantially as shown and described.

In testimony whereof we have signed this specification in the presence of two subscribing witnesses.

CHARLES MORGAN.
EDGAR H. MORGAN.

Witnesses:
JOHN A. MARTIN,
J. A. CRAIN.